(12) United States Patent
Kemmler et al.

(10) Patent No.: US 10,751,814 B2
(45) Date of Patent: Aug. 25, 2020

(54) CUTTING INSERT, TOOL HOLDER AND TOOL

(71) Applicant: Hartmetall-Werkzeugfabrik Paul Horn GmbH, Tuebingen (DE)

(72) Inventors: Tobias Kemmler, Pliezhausen (DE); Matthias Luik, Reutlingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 16/128,789

(22) Filed: Sep. 12, 2018

(65) Prior Publication Data
US 2019/0015909 A1 Jan. 17, 2019

Related U.S. Application Data

(63) Continuation of application No. PCT/EP2017/052037, filed on Jan. 31, 2017.

(30) Foreign Application Priority Data

Mar. 17, 2016 (DE) .......................... 10 2016 104 960

(51) Int. Cl.
*B23C 5/10* (2006.01)
(52) U.S. Cl.
CPC ............ *B23C 5/10* (2013.01); *B23C 2210/02* (2013.01); *B23C 2210/03* (2013.01); *B23C 2210/24* (2013.01); *B23C 2240/24* (2013.01)
(58) Field of Classification Search
CPC ............ B23C 2210/02; B23C 2210/03; B23C 2210/24; B23C 2200/121; B23C 5/109; B23C 5/10
See application file for complete search history.

(56) References Cited

U.S. PATENT DOCUMENTS

| 4,834,597 A | 5/1989 | Andersson et al. |
| 5,551,811 A | 9/1996 | Satran et al. |

(Continued)

FOREIGN PATENT DOCUMENTS

| CN | 1121329 A | 4/1996 |
| CN | 1205661 A | 1/1999 |

(Continued)

OTHER PUBLICATIONS

International Preliminary Report on Patentability for International Application No. PCT/EP2017/052037, dated Sep. 27, 2018.

(Continued)

*Primary Examiner* — Nicole N Ramos
(74) *Attorney, Agent, or Firm* — Jason H. Vick; Sheridan Ross, PC

(57) ABSTRACT

A cutting insert, an associated tool holder, and a tool comprising such a cutting insert and such a tool holder. The cutting insert has a base body, which defines a cutting insert longitudinal axis, at least one cutting body, which laterally projects from a periphery of the base body and comprises a cutting edge, and a cutting insert bore, which is provided in the base body and extends along the cutting insert longitudinal axis, wherein on an underside, running transversely to the cutting insert longitudinal axis, of the base body are provided a plurality of elevations, which are arranged distributed in the peripheral direction and protrude from the underside of the base body, so that, between respectively two adjacent elevations, a relative depression is respectively obtained, wherein the cutting insert comprises at least one radial contact surface, a plurality of axial contact surfaces and a plurality of torque transfer surfaces for a bearing contact of the cutting insert against the tool holder.

19 Claims, 6 Drawing Sheets

(56) References Cited

U.S. PATENT DOCUMENTS

| | | | |
|---|---|---|---|
| 5,598,751 A | 2/1997 | Ochayon et al. | |
| 5,607,263 A | 3/1997 | Nespeta et al. | |
| 5,800,098 A | 9/1998 | Satran et al. | |
| 6,012,881 A | 1/2000 | Scheer | |
| 6,146,060 A | 11/2000 | Rydberg et al. | |
| 6,276,879 B1* | 8/2001 | Hecht | B23B 31/008 279/93 |
| 6,394,711 B1 | 5/2002 | Brosius | |
| 6,623,202 B2* | 9/2003 | Hansson | B23B 31/008 403/359.6 |
| 6,896,450 B2 | 5/2005 | Rothenstein | |
| 7,101,127 B2 | 9/2006 | Kimura et al. | |
| 7,150,590 B2 | 12/2006 | Schäfer et al. | |
| 7,153,066 B2 | 12/2006 | Schager et al. | |
| 7,189,039 B2* | 3/2007 | Pantzar | B23B 29/046 279/8 |
| 8,708,611 B2 | 4/2014 | Marshansky | |
| 8,967,928 B2 | 3/2015 | Kress | |
| 9,943,914 B2 | 4/2018 | Zabrosky | |
| 2002/0159851 A1* | 10/2002 | Krenzer | B23B 51/02 408/230 |
| 2003/0219321 A1* | 11/2003 | Borschert | B23B 51/02 408/230 |
| 2006/0051167 A1* | 3/2006 | Massa | B23B 27/12 407/103 |
| 2009/0123244 A1* | 5/2009 | Buettiker | B23D 77/006 408/233 |
| 2012/0039676 A1 | 2/2012 | Marshansky | |
| 2015/0003922 A1* | 1/2015 | Orlov | B23C 5/109 407/42 |
| 2016/0089729 A1* | 3/2016 | Cigni | B23B 31/1122 407/11 |

FOREIGN PATENT DOCUMENTS

| | | |
|---|---|---|
| CN | 1229375 A | 9/1999 |
| CN | 103052460 A | 4/2013 |
| CN | 105209199 A | 12/2015 |
| DE | 19605157 A1 | 9/1996 |
| DE | 10009721 A1 | 9/2001 |
| DE | 102004023710 A1 | 12/2005 |
| DE | 102010042614 A1 | 4/2011 |
| EP | 2818268 | 12/2014 |
| JP | S57-189713 U | 12/1982 |
| JP | S63-278735 A | 11/1988 |
| JP | H07-164234 A | 6/1995 |
| JP | H07-506300 A | 7/1995 |
| JP | H08-309611 A | 11/1996 |
| JP | 2003-533358 A | 11/2003 |
| JP | 2004-098272 A | 4/2004 |
| JP | 2006-247814 A | 9/2006 |
| JP | 2009-504427 A | 2/2009 |
| JP | 2013-534189 A | 9/2013 |
| SU | 462662 A1 | 3/1975 |
| SU | 1745438 A1 | 7/1992 |
| WO | WO 1997/23322 | 7/1997 |
| WO | WO 03/097281 | 11/2003 |
| WO | WO 03/097282 | 11/2003 |
| WO | WO 2012/166641 | 12/2012 |
| WO | WO 2016/024819 | 2/2016 |

OTHER PUBLICATIONS

Office Action for corresponding Chinese Patent Application No. 201780017825,6, dated Jun. 20, 2019.
Decision to Grant a Patent for an Invention for corresponding Russian Application No. 2018136360/02(060131), dated Jun. 7, 2019.
International Search Report for International Application No. PCT/EP2017/052037, dated Jun. 6, 2017.
Written Opinion for International Application No. PCT/EP2017/052037, dated Jun. 6, 2017.
Notification of Reasons for Refusal (Including Translation) for corresponding Japanese Patent Application No. JP 2018-548777, dated Oct. 1, 2019.
Office Action (Including machine translation) for corresponding Chinese Patent Application No. 201780017825.6, dated Mar. 31, 2020.
Notification of Reasons for Refusal (Including Machine Translation) for corresponding Japanese Patent Application No. JP 2018-548777, dated May 19, 2020.

* cited by examiner

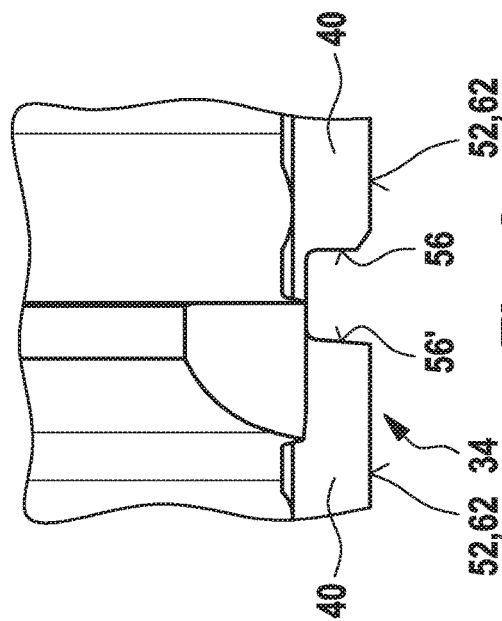
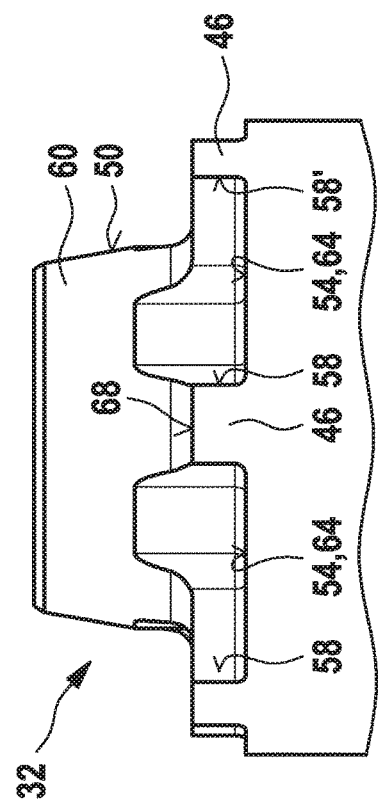
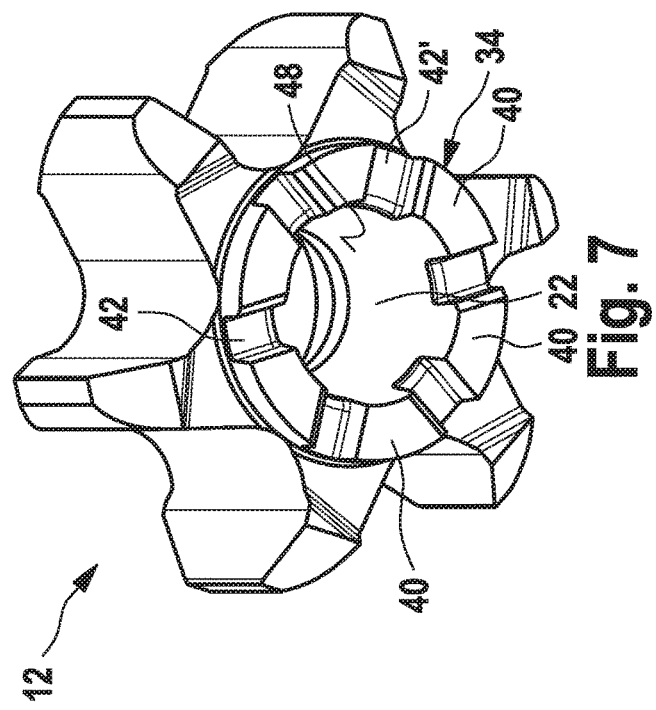
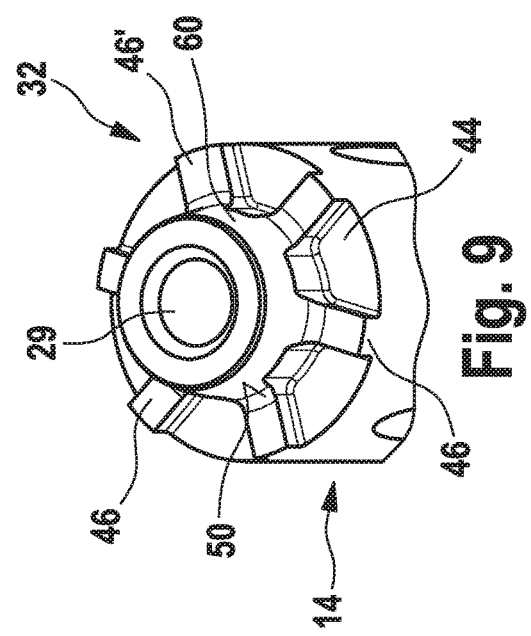

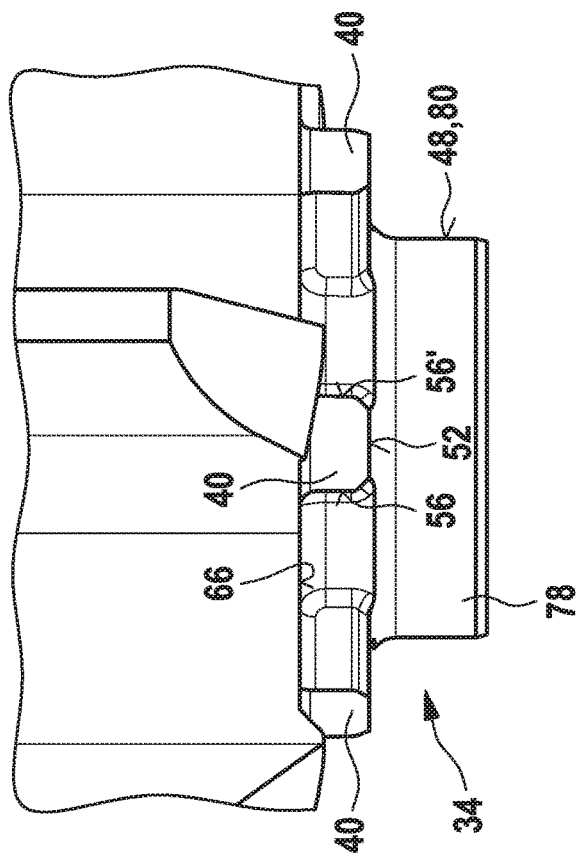
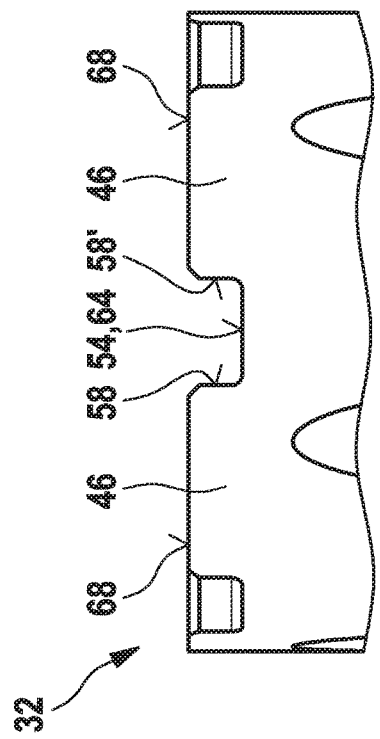
Fig. 12
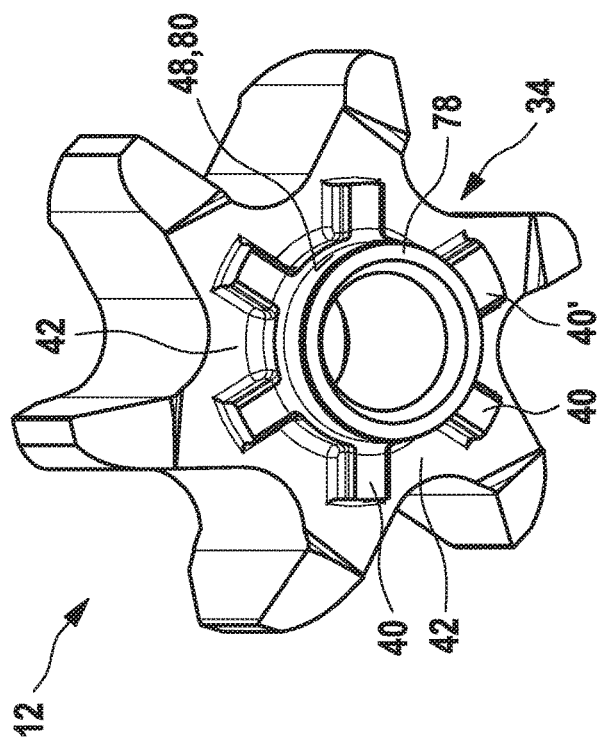
Fig. 11
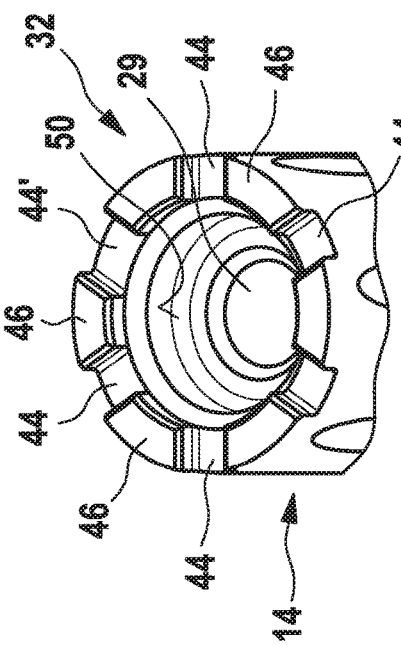
Fig. 13
Fig. 14

CUTTING INSERT, TOOL HOLDER AND TOOL

CROSS REFERENCE TO RELATED APPLICATIONS

This application is a continuation of international patent application PCT/EP2017/052037, filed on Jan. 31, 2017 designating the U.S., which international patent application has been published in German language and claims priority from German patent application DE 10 2016 104 960.3, filed on Mar. 17, 2016. The entire contents of these priority applications are incorporated herein by reference.

BACKGROUND OF THE INVENTION

This disclosure relates to a cutting insert, a tool holder and a tool comprising such a cutting insert and such a tool holder. The tool is preferably a milling cutter, in particular a so-called circular milling cutter.

Milling cutters are often used in CNC machining centers for the machining of metal parts. In circular milling, which is also referred to as rotary milling, the tool rotates about its longitudinal axis, wherein the tool, in addition to this rotation, is also moved translatorily, for instance on a circular or helical path. This production type is often chosen for the creation of bores, spigots, collars, recesses or undercuts.

Many circular milling cutters comprise a cutting insert made of carbide, which is fastened to a steel tool holder by means of a screw. In case of wear, the cutting insert is thus able to be exchanged for a new one, whereas the tool holder is capable of multiple use.

Due to the very high torques which are generated in the tool during the milling, particular requirements are placed on the interface between cutting insert and tool holder. The insert seat must be designed to be extremely stable and be suitable for the transmission of high torques. To this end, it is particularly important that the cutting insert bears in an exactly defined manner against the tool holder.

SUMMARY OF THE INVENTION

It is an object to provide a cutting insert, a tool holder and a tool comprising such a cutting insert and such a tool holder, which are suitable, in particular, for circular milling and enable a high torque transmission.

According to a first aspect, a cutting insert for a tool for machining a workpiece is presented, comprising:
  a base body, which defines a cutting insert longitudinal axis;
  at least one cutting body, which laterally projects from a periphery of the base body and comprises a cutting edge;
  a cutting insert bore, which is provided in the base body and extends along the cutting insert longitudinal axis, wherein on an underside, running transversely to the cutting insert longitudinal axis, of the base body are provided a plurality of elevations, which are arranged distributed in a peripheral direction and protrude from the underside of the base body, so that between respectively two adjacent elevations a relative depression is respectively obtained;
  at least one radial contact surface, a plurality of axial contact surfaces and a plurality of torque transfer surfaces for a bearing contact of the cutting insert against a tool holder, wherein the at least one radial contact surface lies on a cylindrical envelope or conical envelope symmetrical to the cutting insert longitudinal axis, wherein the axial contact surfaces are respectively arranged either on a top side, running transversely to the cutting insert longitudinal axis, of the elevations, or on a base surface, running transversely to the cutting insert longitudinal axis, of the depressions, and the torque transfer surfaces are arranged respectively on a lateral flank of the elevations, and wherein the at least one radial contact surface, the axial contact surfaces and the torque transfer surfaces run transversely to one another; and
  a spigot, which protrudes further from the underside of the base body than the elevations and is symmetrical to the cutting insert longitudinal axis, and wherein the at least one radial contact surface is an uninterrupted, continuous cylindrical or conical surface which is arranged on an outer side, facing away from the cutting insert longitudinal axis, of the spigot.

According to a second aspect, a tool for machining a workpiece is presented, which comprises a cutting insert, a tool holder, and a fastening element which fastens the cutting insert to the tool holder, wherein the cutting insert comprises:
  a base body, which defines a cutting insert longitudinal axis;
  at least one cutting body, which laterally projects from a periphery of the base body and comprises a cutting edge;
  a cutting insert bore, which is provided in the base body and extends along the cutting insert longitudinal axis, wherein on an underside, running transversely to the cutting insert longitudinal axis, of the base body are provided a plurality of elevations, which are arranged distributed in a peripheral direction and protrude from the underside of the base body, so that between respectively two adjacent elevations a relative depression is respectively obtained;
  at least one radial contact surface, a plurality of axial contact surfaces and a plurality of torque transfer surfaces for a bearing contact of the cutting insert against a tool holder, wherein the at least one radial contact surface lies on a cylindrical envelope or conical envelope symmetrical to the cutting insert longitudinal axis, wherein the axial contact surfaces are respectively arranged either on a top side, running transversely to the cutting insert longitudinal axis, of the elevations, or on a base surface, running transversely to the cutting insert longitudinal axis, of the depressions, and the torque transfer surfaces are arranged respectively on a lateral flank of the elevations, and wherein the at least one radial contact surface, the axial contact surfaces and the torque transfer surfaces run transversely to one another; and
  a spigot, which protrudes further from the underside of the base body than the elevations and is symmetrical to the cutting insert longitudinal axis, and wherein the at least one radial contact surface is an uninterrupted, continuous cylindrical or conical surface which is arranged on an outer side, facing away from the cutting insert longitudinal axis, of the spigot.

According to a refinement, it is preferred that, in the mounted state of the tool, the at least one radial contact surface of the cutting insert bears against the at least one radial contact surface of the holder, that the axial contact surfaces of the cutting insert bear against the axial contact surfaces of the tool holder, and that the torque transfer surfaces of the cutting insert bear against the torque transfer surfaces of the tool holder. Particularly preferably, the cutting insert and tool holder contact each other only at said contact surfaces.

With regard to the terms used in the present document, the following should firstly be pointed out: the contact surfaces are labeled in accordance with their function. The radial contact surfaces serve for the absorption or transmission of forces in the radial direction of the cutting insert or of the tool holder. The axial contact surfaces serve for the absorption or transmission of forces in the axial direction or longitudinal direction, i.e. parallel to the longitudinal axis of the cutting insert and of the tool holder. The torque transfer surfaces serve for the absorption or transmission of forces in the peripheral direction or rotational direction of the cutting insert and of the tool holder.

The term "transversely" should in the present case be understood as "non-parallel", i.e. an angle unequal to 0°. "Transversely" should preferably, but not necessarily be understood to mean perpendicularly or orthogonally. The terms "substantially perpendicularly" or "substantially orthogonally" are in the present case preferably understood as "perpendicularly" or "orthogonally". The terms "substantially perpendicularly" or "substantially orthogonally" should also, however, include minor deviations from a 90° angle, so that angles of 90°±3° should likewise be regarded as "substantially perpendicularly" or "substantially orthogonally". The terms "relative depression" or "relative elevation" are in the present case used to make clear that this does not necessarily involve an actual depression or actual elevation. A relative depression is automatically obtained between two adjacent elevations (viewed relative thereto). Equally, an elevation is automatically obtained between two adjacent depressions (likewise viewed relative thereto).

On the cutting insert as well as on the tool holder, a radial contact surface, which is cylindrical or conical, preferably respectively exists. Moreover, on the cutting insert and on the tool holder, a plurality of axial contact surfaces, which run transversely to the cutting insert longitudinal axis or transversely to the holder longitudinal axis, respectively exist. In addition, on the cutting insert, as well as on the tool holder, are arranged a plurality of torque transfer surfaces, which run transversely to the axial contact surfaces. The number of axial contact surfaces on the cutting insert preferably corresponds to the number of axial contact surfaces on the tool holder. Similarly, the number of torque transfer surfaces arranged on the cutting insert corresponds to the number of torque transfer surfaces arranged on the tool holder.

Both on the cutting insert and on the tool holder, the axial contact surfaces are preferably separated from one another, and not connected to one another, in the peripheral direction. Between two adjacent contact surfaces is respectively arranged an elevation or a depression. This applies both to the axial contact surfaces which are arranged on the cutting insert and to the axial contact surfaces which are arranged on the tool holder. As a result, a type of segmentation of the axial bearing contact is obtained both on the cutting insert and on the tool holder.

As a result of the cylindrical or conical radial bearing contact and the segmented axial bearing contact between cutting insert and tool holder, it is possible to shift the torque transmission as far to the outside as possible. This has the advantage that very high torques are thereby able to be transmitted without loss of stability. The torque transfer surfaces are segmented similarly to the axial contact surfaces and distributed in the peripheral direction on the cutting insert or on the tool holder. The torque transfer surfaces are formed by the lateral flanks of the elevations or depressions which are arranged on the cutting insert or on the tool holder. All in all, an extremely stable and exactly defined insert seat, which enables the transmission of very high torques, is thus obtained.

The cutting insert comprises a spigot, which protrudes further from the underside of the base body than the elevations and is symmetrical to the cutting insert longitudinal axis. The radial contact surface is thus arranged on an outer side, facing away from the cutting insert longitudinal axis, of the spigot. The feature that the spigot protrudes further from the underside of the base body than the elevations means, in other words, that the height, measured parallel to the cutting insert longitudinal axis, of the spigot is greater than the height of the elevations. As a result, the radial contact surface provided on the outer side of the spigot can be of continuous, i.e. fully circumferential, design. This improves the stability.

Preferably, the elevations are arranged directly adjoining the spigot. According to a refinement, it is provided that the elevations extend radially outward from the periphery of the spigot. According to an alternative refinement, it is provided that, although the elevations themselves do not extend outward exactly in the radial direction, a torque transfer surface arranged on the elevations runs in the radial direction.

The provision of the radial contact surface on the spigot has in particular the advantage that the radial contact surface is able to be ground comparatively easily.

Below, further refinements of the cutting insert are described. These refinements can also be correspondingly provided on the tool holder.

According to an alternative refinement, the at least one radial contact surface is arranged in the cutting insert bore. The cutting insert bore is then used as the radial bearing point. To this end, the cutting insert bore is preferably reground during manufacture in order to enable a radial bearing contact between cutting insert and tool holder which is as exact as possible.

In the last-named refinement, in which the radial contact surface is arranged in the cutting insert bore, it is additionally preferred that an inner side, facing toward the cutting insert longitudinal axis, of the elevations either directly adjoins the cutting insert bore or is separated therefrom by a chamfer or a recess.

Regardless of whether the radial contact surface is provided on a spigot or in the cutting insert bore, the radial contact surface is preferably an uninterrupted, continuous cylindrical or conical surface. However, it is also possible to segment this radial contact surface likewise, for instance by recesses, insofar as the individual segments continue to lie on a common cylindrical envelope or a common conical envelope.

A cylindrical contact surface is easier to produce than a conical contact surface. On the other hand, a conical or cone-shaped contact surface has the advantage that the radial bearing clearance between cutting insert and tool holder can be reduced still further than with the cylindrical shape.

The axial contact surfaces preferably all lie in a common plane which runs substantially perpendicularly, preferably exactly perpendicularly, to the cutting insert longitudinal axis. The axial contact surfaces are preferably planar contact surfaces. In principle, convex or concave shapes would also, however, be possible.

The torque transfer surfaces run substantially perpendicularly, preferably exactly perpendicularly, to the axial contact surfaces, and substantially parallel, preferably exactly parallel, to the cutting insert longitudinal axis. However, the torque transfer surfaces can also be somewhat inclined in relation to the cutting insert longitudinal axis. The axial contact surfaces are preferably connected to the torque transfer surfaces via a radius and/or chamfer.

According to a further refinement, the torque transfer surfaces are realized as 'as sintered' surfaces, and the at least one radial contact surface and the axial contact surfaces as ground surfaces. By an "'as sintered' surface" is understood in the present case a surface which is formed on a sintered component after the sintering process and is not further machined or specifically reground.

According to a further refinement, the elevations comprise a first and a second elevation, wherein the first elevation has a different shape and/or size than the second elevation. Preferably, on the cutting insert are arranged a plurality of first elevations and a single second elevation. It is in this way ensured that the cutting insert can be secured to the tool holder only in a single orientation. This is of advantage in particular because it is hereby ensured that the coolant bores which are generally provided on the tool holder are exactly aligned relative to the at least one cutting body provided on the cutting insert. In addition, this refinement is also of advantage with regard to the precision, since the cutting edges are always produced (ground) and used in the same alignment.

Preferably, the cutting insert comprises in total three, six or nine of said elevations.

As already mentioned, the above-mentioned refinements can be correspondingly provided also on the tool holder.

According to a further aspect of the present disclosure, a tool holder for a tool for machining a workpiece is presented, comprising:
- a shank, which extends substantially along a holder longitudinal axis and comprises at a front-face end an interface for connecting a cutting insert to the tool holder, wherein the interface comprises a plurality of depressions, which are arranged distributed in a peripheral direction and are separated from one another by relative elevations which are formed respectively between two adjacent depressions;
- a holder bore, which is provided in the shank and extends along the holder longitudinal axis,
- at least one radial contact surface, a plurality of axial contact surfaces and a plurality of torque transfer surfaces for a bearing contact of the cutting insert against the tool holder, wherein the at least one radial contact surface lies on a cylindrical envelope or conical envelope which is symmetrical to the holder longitudinal axis, wherein the axial contact surfaces are arranged respectively either on a base surface, running transversely to the holder longitudinal axis, of the depressions, or on a top side, running transversely to the holder longitudinal axis, of the elevations, and the torque transfer surfaces are arranged respectively on a lateral flank of the depressions, and wherein the at least one radial contact surface, the axial contact surfaces and the torque transfer surfaces run transversely to one another; and
- a spigot, which protrudes further from the front-face end of the tool holder than the elevations and is symmetrical to the holder longitudinal axis, wherein the at least one radial contact surface is a continuous cylindrical or conical surface which is arranged on an outer side, facing away from the holder longitudinal axis, of the spigot.

According to a still further aspect of the present disclosure, a tool for machining a workpiece is presented, which comprises a cutting insert, a tool holder, and a fastening element which fastens the cutting insert to the tool holder, wherein the tool holder comprises:
- a shank, which extends substantially along a holder longitudinal axis and comprises at a front-face end an interface for connecting a cutting insert to the tool holder, wherein the interface comprises a plurality of depressions, which are arranged distributed in a peripheral direction and are separated from one another by relative elevations which are formed respectively between two adjacent depressions;
- a holder bore, which is provided in the shank and extends along the holder longitudinal axis,
- at least one radial contact surface, a plurality of axial contact surfaces and a plurality of torque transfer surfaces for a bearing contact of the cutting insert against the tool holder, wherein the at least one radial contact surface lies on a cylindrical envelope or conical envelope which is symmetrical to the holder longitudinal axis, wherein the axial contact surfaces are arranged respectively either on a base surface, running transversely to the holder longitudinal axis, of the depressions, or on a top side, running transversely to the holder longitudinal axis, of the elevations, and the torque transfer surfaces are arranged respectively on a lateral flank of the depressions, and wherein the at least one radial contact surface, the axial contact surfaces and the torque transfer surfaces run transversely to one another; and
- a spigot, which protrudes further from the front-face end of the tool holder than the elevations and is symmetrical to the holder longitudinal axis, wherein the at least one radial contact surface is a continuous cylindrical or conical surface which is arranged on an outer side, facing away from the holder longitudinal axis, of the spigot.

According to an alternative refinement, the radial contact surface provided on the tool holder is arranged in the holder bore.

According to a further refinement, the axial contact surfaces of the tool holder lie in a common plane which runs substantially perpendicularly, preferably exactly perpendicularly, to the holder longitudinal axis.

The torque transfer surfaces of the tool holder run preferably substantially perpendicularly to the axial contact surfaces and substantially parallel to the holder longitudinal axis.

In embodiment further refinement of the tool holder, the depressions comprise a first depression and a second depression, wherein the first depression has a different shape and/or size than the second depression.

On the tool holder are preferably provided, in total, three, six or nine of said depressions.

It is to be understood that the features mentioned above and the features yet to be explained hereunder are capable to be used not only in the combination stated in each case, but can likewise be used in other combinations or individually, without departing from the spirit and scope of the present disclosure.

BRIEF DESCRIPTION OF THE DRAWINGS

FIG. 7 shows a perspective view of the cutting insert according to a second embodiment;

FIG. 8 shows a detail of the cutting insert shown in FIG. 7;

FIG. 9 shows a perspective view of the tool holder according to a second embodiment;

FIG. 10 shows a detail of the tool holder shown in FIG. 9;

FIG. 11 shows a perspective view of the cutting insert according to a third embodiment;

FIG. 12 shows a detail of the cutting insert shown in FIG. 11;

FIG. 13 shows a perspective view of the tool holder according to a third embodiment;

FIG. 14 shows a detail of the tool holder shown in FIG. 13;

DESCRIPTION OF PREFERRED EMBODIMENTS

Figure 1:
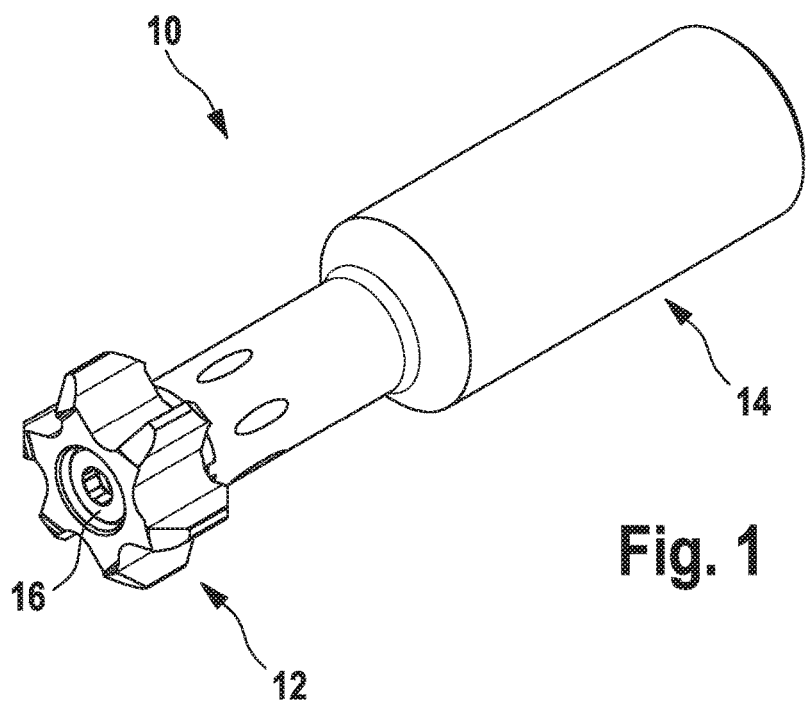
FIG. 1 shows a perspective view of a first embodiment of the herein presented tool.
Figure 2:
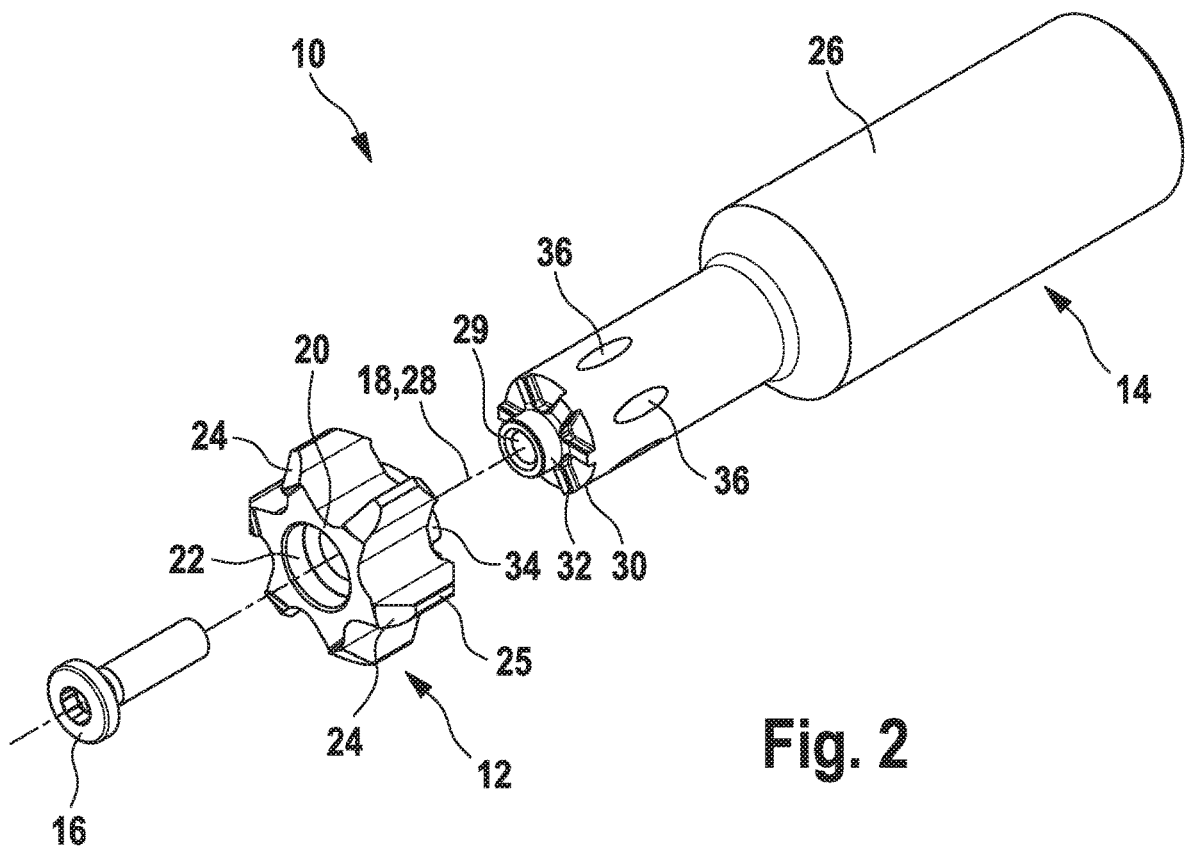
FIG. 2 shows an exploded representation of the embodiment of the tool which is shown in FIG. 1.

FIGS. 1 and 2 show an embodiment of the herein presented tool. The tool is therein denoted in its entirety by the reference numeral 10.

The tool 10 comprises a cutting insert 12 and a tool holder 14. The cutting insert 12 is preferably made of carbide. The tool holder 14 is preferably made of steel.

The cutting insert 12 is fastened by means of a fastening element 16 to the tool holder 14. The fastening element 16 is preferably a clamping screw, which engages in a corresponding thread provided in the tool holder 14.

The cutting insert 12 is preferably, but not absolutely necessarily symmetrical to a cutting insert longitudinal axis 18. It has a base body 20, which extends around the cutting insert longitudinal axis 18. The base body 20 comprises a cutting insert bore 22. The cutting insert bore 22 passes through the base body 20 and extends along the cutting insert longitudinal axis 18. The cutting insert bore 22 is thus configured as a through bore.

Furthermore, the cutting insert 12 comprises a plurality of cutting bodies 24, which laterally project from the periphery of the base body 20. The cutting bodies 24 project outward from the base body 20 substantially in the radial direction.

It is obvious, however, that the cutting bodies 24 do not have to protrude from the base body 20 exactly in the radial direction. They can also be slightly curved or inclined in relation to the radial direction. On each cutting body 24 is provided at least one cutting edge 25. In the embodiments shown in the drawings, the cutting insert 12 comprises in total six cutting bodies 24, which laterally protrude from the base body 20. The cutting insert 12 can also, however, have just one, two, three, four, five, or more than six cutting bodies 24 which laterally protrude from the base body 20. Preferably, the cutting insert 12 comprises three, six or nine cutting bodies 24.

The tool holder 14 has a shank 26, which, at least in some sections is of cylindrical construction. This shank 26 extends along a holder longitudinal axis 28. In the mounted state of the tool 10, the holder longitudinal axis 28 coincides with the cutting insert longitudinal axis 18. Along the holder longitudinal axis 28, within the shank 26 extends a holder bore 29. This is preferably realized as a blind bore, yet can also be realized as a through bore through the whole of the tool holder 14.

At a front-face end 30 of the shank 26, the tool holder 14 comprises an interface 32 for the connection of the cutting insert 12. This interface 32 is able to be coupled with a corresponding interface 34 which is arranged on the cutting insert 12.

The shank 26 of the tool holder 14 additionally comprises a plurality of internal coolant bores (not explicitly shown), by means of which coolant is able to be conducted within the tool holder 14 toward the cutting insert 12. These coolant ducts end in coolant outlets 36, which in the region of the front-face end 30 are arranged distributed in the peripheral direction on the shank 26.

The interfaces 32, 34 are two, mutually corresponding counterparts. FIG. 3-22 show five different embodiments of the interfaces 32, 34.

Figure 4:
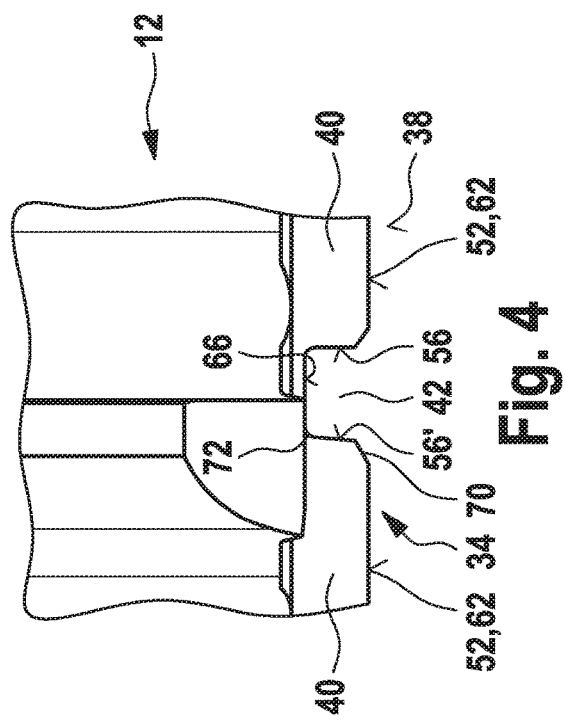
FIG. 4 shows a detail of the cutting insert shown in FIG. 3.
Figure 6:
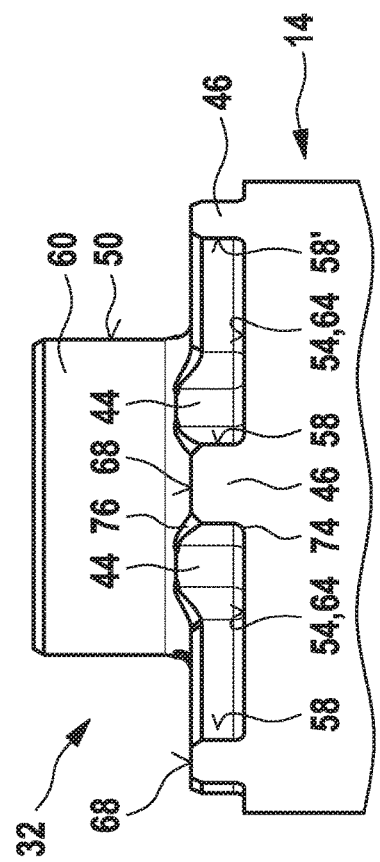
FIG. 6 shows a detail of the tool holder shown in FIG. 5.
Figure 3:
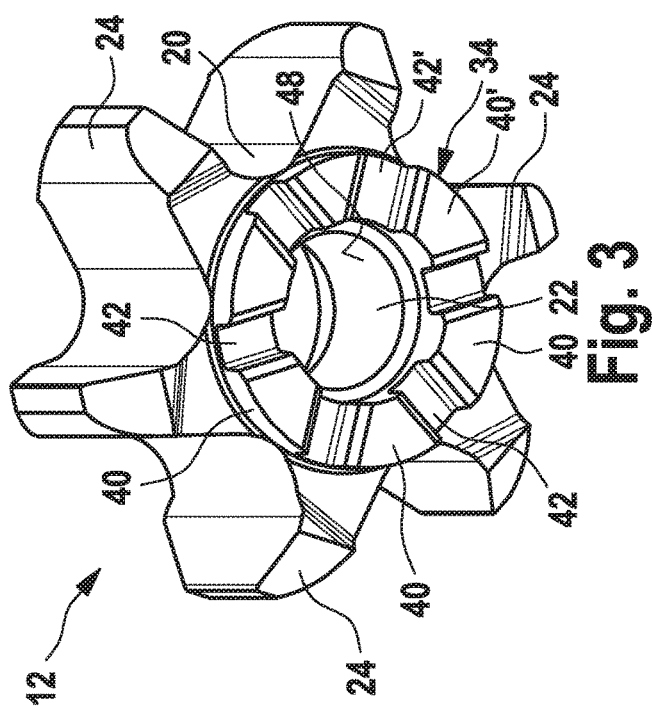
FIG. 3 shows a perspective view of a cutting insert according to a first embodiment.
Figure 5:
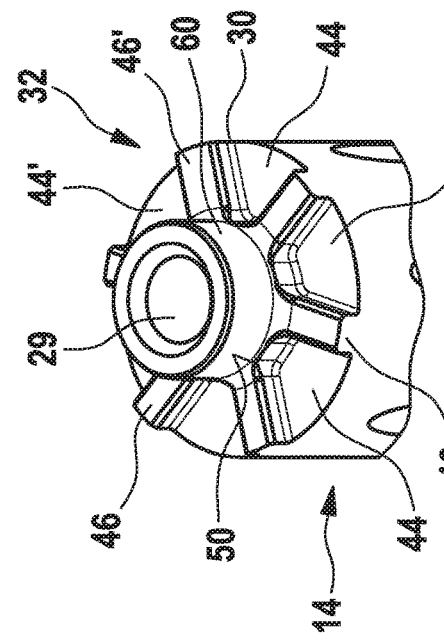
FIG. 5 shows a perspective view of a tool holder according to a first embodiment.
Figure 16:
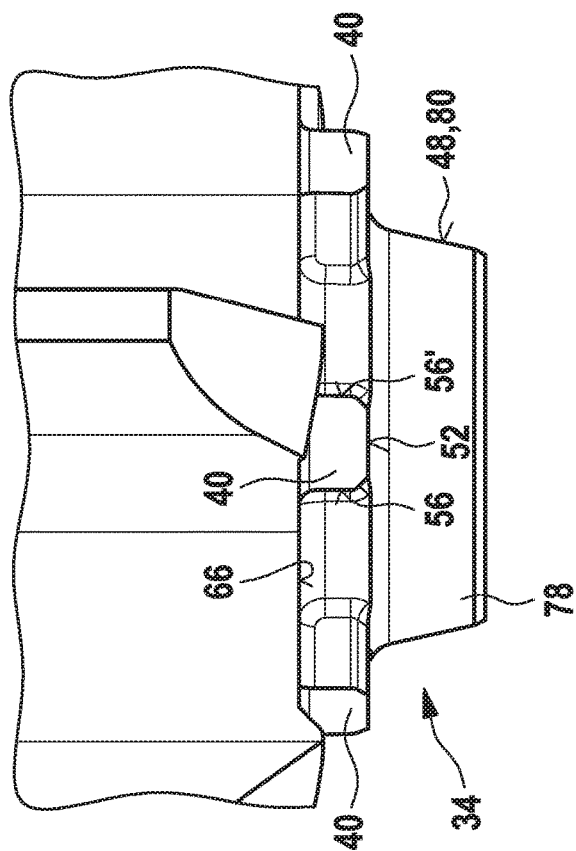
FIG. 16 shows a detail of the cutting insert shown in FIG. 15.

FIG. 3-6 show a first embodiment of the cutting insert 12 and the tool holder 14 and of the interface 34 and the interface 32. FIGS. 3 and 4 show the cutting insert 12 in a perspective view from obliquely below and in a detailed view in the region of the interface 34. FIGS. 5 and 6 show the tool holder 14 in the region of the interface 32 in a perspective view and in a side view.

The interface 34 is arranged on an underside of the base body 20 of the cutting insert 12. The interface 32 is arranged in the region of the front-face end 30 of the tool holder 14.

The interface 34 comprises a plurality of elevations 40, which protrude downward from the underside 38 of the base body 20, parallel to the longitudinal axis 18. These elevations or elevation regions 40 are arranged evenly distributed in the peripheral direction on the cutting insert 12. Between these elevations 40 are obtained depressions 42, which in the present case are referred to as relative depressions, since these do not necessarily have to be realized as material cutouts which are recessed into the base body 20 of the cutting insert 12, but merely have to be recessed relative to the adjacent elevations 40. The depressions 42 are thus likewise arranged distributed in the peripheral direction on the cutting insert 12. The number of depressions 42 corresponds to the number of elevations 40. In the present example, respectively six elevations 40 and six depressions 42 exist. The number of elevations 40 and depressions 42 preferably corresponds to the number of cutting bodies 24 which project laterally from the base body 20.

Correspondingly to the elevations 40 and depressions 42 provided on the cutting insert 12, the interface 32 provided on the tool holder 14 likewise comprises depressions 44 and elevations 46. Obviously, the number of depressions 44 provided on the tool holder corresponds absolutely necessarily to the number of elevations 40 which are provided on the cutting insert 12. Similarly, the number of elevations 46 provided on the tool holder 14 corresponds to the number of depressions 42 provided on the cutting insert 12.

For the transmission of the forces acting between tool holder 14 and cutting insert 12 during the use of the tool 10, the interfaces 32, 34 have a plurality of contact surfaces, with which the cutting insert 12 bears against the tool holder 14. The interface 32, as well as the interface 34, have respectively three different types of contact surfaces. Respectively a radial contact surface 48, 50 serves for the transmission of forces in the radial direction of the cutting insert 12 or of the tool holder 14. A plurality of axial contact surfaces 52, 54 serve for the force transmission in the axial direction, i.e. parallel to the cutting insert longitudinal axis 18 or holder longitudinal axis 28. A plurality of torque transfer surfaces 56, 58 serve for the force transmission or torque transmission in the peripheral direction of the cutting insert 12 and tool holder 14 respectively.

In that first embodiment of the cutting insert 12 which is represented in FIGS. 3 and 4, the radial contact surface 48 of the interface 34 is arranged in the cutting insert bore 22. This Correspondingly to this radial contact surface 48 provided on the cutting insert 12, the interface 32 of the tool holder 14 comprises a radial contact surface 50. According to that first embodiment of the tool holder 14 which is shown in FIGS. 5 and 6, this radial contact surface 50 is arranged on a spigot 60, which protrudes from the front-face end 30 of the tool holder 14. The spigot 60 and the radial contact surface 50 are aligned preferably parallel and symmetrically to the holder longitudinal axis 28. According to the first embodiment, the radial contact surfaces 48, 50 are respectively cylindrical surfaces.

The axial contact surfaces of the interface 34 of the cutting insert 12 are preferably arranged on the top sides 62, running transversely to the cutting insert longitudinal axis 18, of the elevations 40 (see FIG. 4). The axial contact surfaces 54 of the interface 32 of the tool holder 14 are accordingly arranged on the base surfaces 64, aligned transversely to the holder longitudinal axis 28, of the depressions 44, or are formed by these. The axial contact surfaces 52, 54 are preferably respectively configured as planar surfaces. The axial contact surfaces 52 are preferably aligned orthogonally to the cutting insert longitudinal axis 18. The axial contact surfaces 54 are preferably aligned orthogonally to the holder longitudinal axis 28.

In principle, it would also be possible to use the base surfaces 66 of the depressions 42 of the interface 34 and the surfaces correspondingly provided on the top side 68 of the elevations 46 of the interface 32, instead of the surfaces 52, 54, as the axial contact surfaces.

The torque transfer surfaces 56 of the interface 34 of the cutting insert 12 are arranged on the lateral flanks of the elevations 40. The corresponding torque transfer surfaces 58 of the interface 32 of the tool holder 14 are arranged on the lateral flanks of the depressions 44. The torque transfer surfaces 56, 58 are preferably aligned orthogonally to the axial contact surfaces 52, 54. The torque transfer surfaces 56, 58 preferably extend parallel to the cutting insert longitudinal axis 18 or parallel to the holder longitudinal axis 28. However, they can also be inclined at an angle to the longitudinal axis 18 or 28.

Opposite the torque transfer surfaces 56, there respectively exist on the adjacent elevation 40 a further torque transfer surface 56' (see FIG. 4). Similarly, each depression 44 of the interface 32 comprises not only a flank on which the torque transfer surfaces 58 are arranged, but an opposite flank on which a further torque transfer surface 58' is arranged (see FIG. 6). These torque transfer surfaces 56', 58' can likewise be used, depending on the rotational direction of the tool 10, and are preferably constructed or aligned correspondingly to the torque transfer surfaces 56, 58. The distance between two opposite torque transfer surfaces 56, 56' of a depression 42 of the interface 34 is preferably greater than the distance apart of two adjacent torque transfer surfaces 58, 58', which form the flanks of an elevation 46 of the interface 32. The elevations 46 of the interface 32 are thus preferably configured narrower than the depressions 42 of the interface 34. Thus, counter to the rotational direction of the tool 10, some play is created between cutting insert 12 and holder 14.

In addition, it is preferred that a depression 42' of the interface 34 has a different shape and/or size than the other depressions 42. Correspondingly, it is preferred that an elevation 46' of the interface 32 has a different shape and/or size than the other elevations 46. This serves to ensure that the cutting insert 12 is able to be secured to the tool holder 14 only in a single position. In particular a correct alignment of the coolant outlets 36 in relation to the cutting bodies 24 of the cutting insert 12 is thereby ensured. Instead of different types of depressions 42, 42', the interface 34 can also have differently large elevations 40, 40', wherein differently large depressions 44, 44' are likewise provided on the interface 32. This can also obtain cumulatively with the differently large depressions 42, 42' and the differently large elevations 46, 46'.

The axial contact surfaces 52 of the interface 34 of the cutting insert 12 preferably do not directly adjoin the torque transfer surfaces 56, but are separated therefrom by a chamfer 70 (see FIG. 4). Similarly, a radius 72 preferably also exists between the torque transfer surfaces 56 and the base surfaces 66 of the depressions 42 (see FIG. 4). Much the same applies to the interface 32 of the tool holder 14. Between the axial contact surfaces 54 and the torque transfer surfaces 58, a chamfer and/or a radius 74 is here likewise provided (see FIG. 6). Also between the torque transfer surfaces 58 and the top side 68 of the elevations 46 is preferably arranged a chamfer and/or a radius 76 (see FIG. 6).

Further embodiments of the cutting insert 12 and of the tool holder 14 are represented in FIG. 7-18. The basic concept of the clear division into radial contact surfaces, axial contact surfaces and torque transfer surfaces is maintained also in these embodiments. Similarly, the idea of a segmented axial contact surface, wherein the individual segments of the axial contact surface are separated from one another by elevations or depressions, is maintained. Furthermore, also in the embodiments of FIG. 7-18 it is preferred that the axial contact surfaces run orthogonally to the torque transfer surfaces. Therefore, only the differences between the individual embodiments are examined in greater detail below.

FIG. 7-10 show a second embodiment of the cutting insert 12 (see FIGS. 7 and 8) and of the tool holder 14 (see FIGS. 9 and 10). The fundamental difference relative to the first embodiment shown in FIG. 3-6 consists in the fact that the radial contact surface 48 of the interface 34 of the cutting insert 12 is not configured as a cylindrical surface, but as a conical surface. Accordingly, nor is the radial contact surface 50 of the interface 32 of the tool holder 14 configured as a cylindrical surface, but as a conical surface. These conical, radial contact surfaces 48, 50 shall be produced somewhat heavier in comparison to the cylindrical, radial contact surfaces of the first embodiment. They do, however, reduce the radial bearing clearance, for which reason they are advantageous from a design viewpoint.

A further difference between the first two embodiments consists in the fact the chamfers/radii 70, 76 which have been described above in connection with the first embodiment are not, or only partially present in the second embodiment.

FIG. 11-14 show a third embodiment of the cutting insert 12 (FIGS. 11 and 12) and of the tool holder 14 (FIGS. 13 and 14). The fundamental difference relative to the first two embodiments consists in the fact that the profile of the elevations 40, 46 and depressions 42, 44 of the interfaces 34, 32 is reversed or exchanged. The elevations 40 are configured narrower in the peripheral direction in comparison to the first two embodiments. Accordingly, the depressions 42 are configured wider in the peripheral direction. The reverse applies to the elevations 44 and depressions 46 which are provided on the tool holder 14. In comparison to the first two embodiments, the elevations 46 are configured wider in the peripheral direction. The depressions 44 are configured comparatively narrower in the peripheral direction. Still more fundamental is, however, the difference that the interface 32 of the tool holder 14 now no longer comprises a spigot 60. Instead the interface 34 of the cutting insert 12 comprises a spigot 78, which protrudes downward from the underside of the base body 20 of the cutting insert 12. The radial contact surface 48 is arranged on that outer side 80 of the spigot 78 which is facing away from the cutting insert longitudinal axis. In much the same way as with the first embodiment, the radial contact surface 48 has according to the third embodiment a cylindrical shape. The radial contact surface 50 of the interface 32 of the tool holder 14 is arranged in the holder bore 29 (see FIG. 13). It likewise has a cylindrical shape. The arrangement of the axial contact surfaces 52, 54 and the torque transfer surfaces 56, 58 does not differ in comparison to the first two embodiments, apart from the different sizes and/or shapes of the elevations 40, 46 and of the depressions 42, 44. Also in the third embodiment, it is in principle possible to use, instead of the axial contact surface 52 on the top side of the elevations 40, the base surface 66 of the depressions 42 as the axial contact surfaces. Accordingly, it would equally be possible to use the top sides 68 of the elevations 46 instead of the base surfaces 64 of the depressions 44 as the axial contact surfaces. Depending on the direction of rotation, also in the third embodiment the torque transfer takes place either via the torque transfer surfaces 56 and 58 or via the torque transfer surfaces 56' and 58'.

Figure 18:
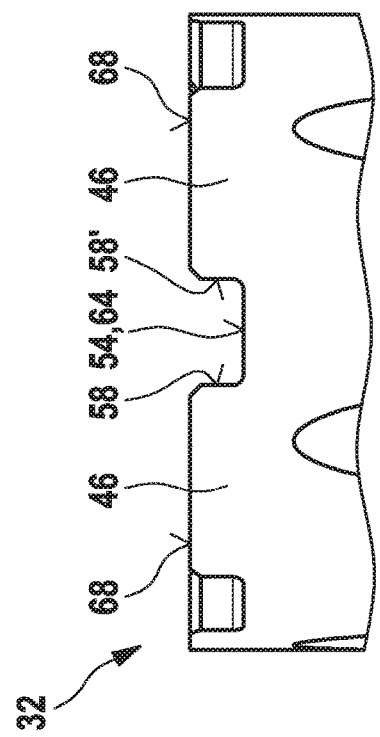
FIG. 18 shows a detail of the tool holder shown in FIG. 17.
Figure 15:
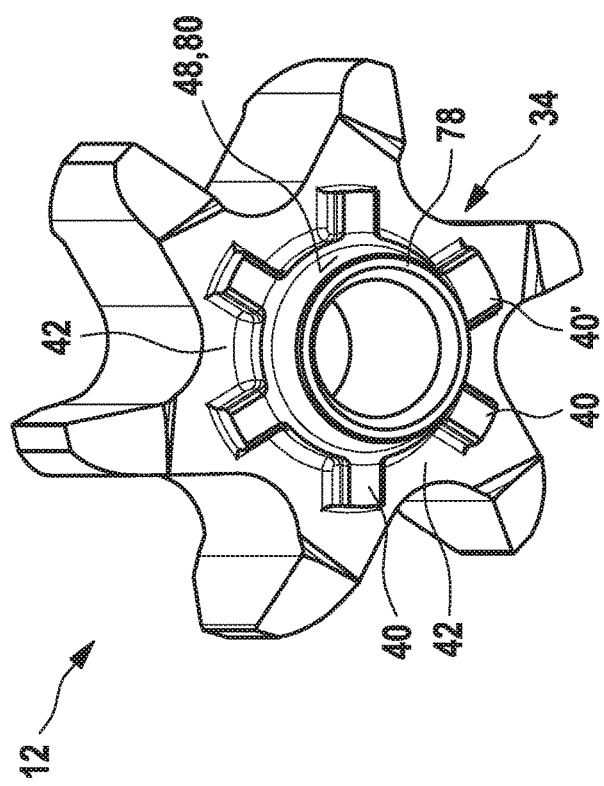
FIG. 15 shows a perspective view of the cutting insert according to a fourth embodiment.
Figure 17:
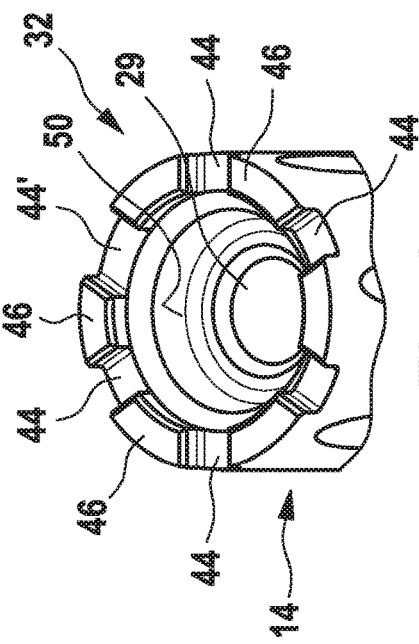
FIG. 17 shows a perspective view of the tool holder according to a fourth embodiment.
Figure 20:
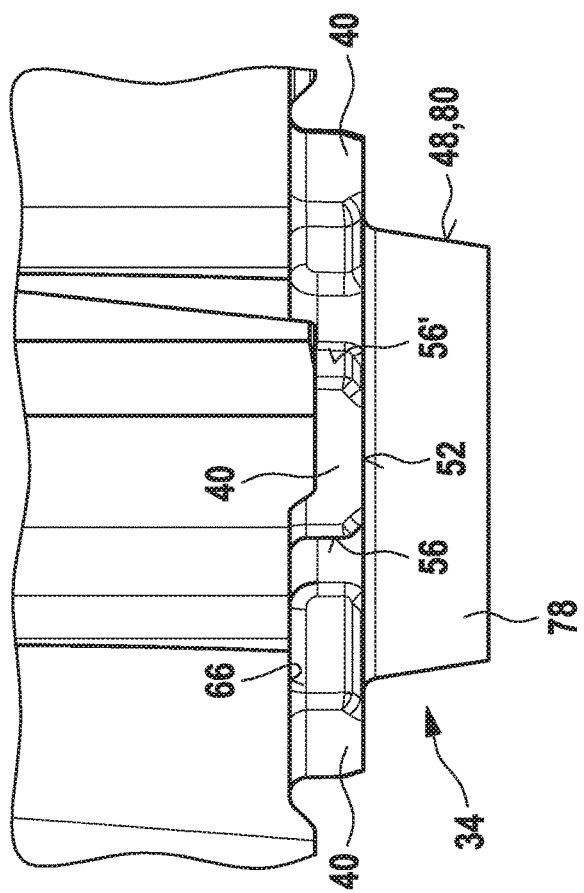
FIG. 20 shows a detail of the cutting insert shown in FIG. 19.

FIG. 15-18 show a fourth embodiment of the cutting insert 12 (FIGS. 15 and 16) and of the tool holder 14 (FIGS. 17 and 18). This fourth embodiment is very similar to the third embodiment, which is represented in FIG. 11-14. The difference between these two embodiments consists in the fact that that radial contact surface 48 of the interface 34 which is arranged on the outer side 80 of the spigot 78 is conically instead of cylindrically shaped (see FIG. 16). Accordingly, that radial contact surface 50 of the interface 32 which is provided in the holder bore 29 is also conically shaped. Otherwise, the rest of the structure does not, or at least does not substantially differ from the third embodiment. Here too, the elevations 40 of the interface 34 extend, starting from the spigot 78, radially outward.

Figure 22:
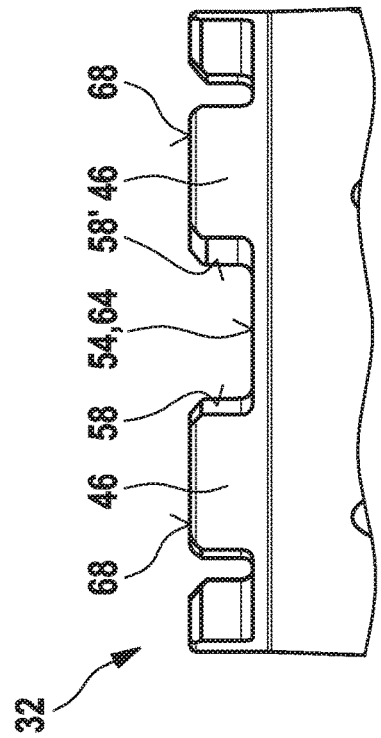
FIG. 22 shows a detail of the tool holder shown in FIG. 21.
Figure 19:
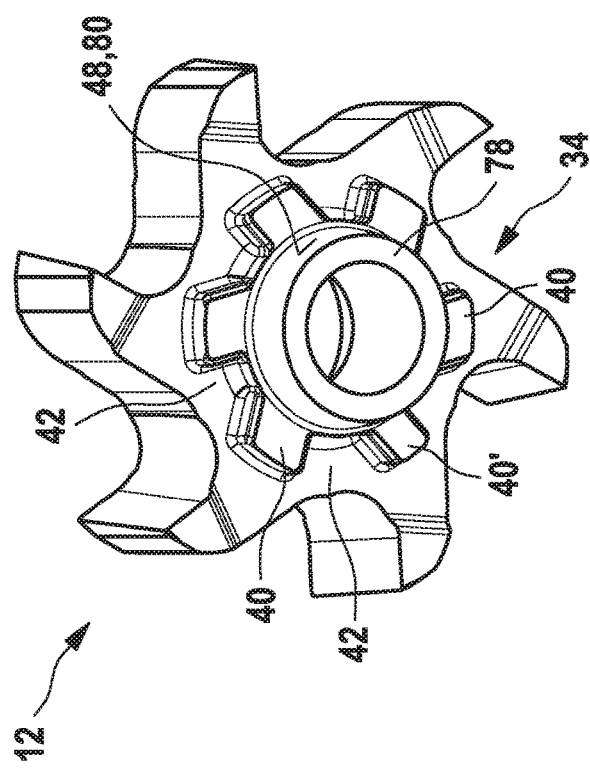
FIG. 19 shows a perspective view of the cutting insert according to a fifth embodiment.
Figure 21:
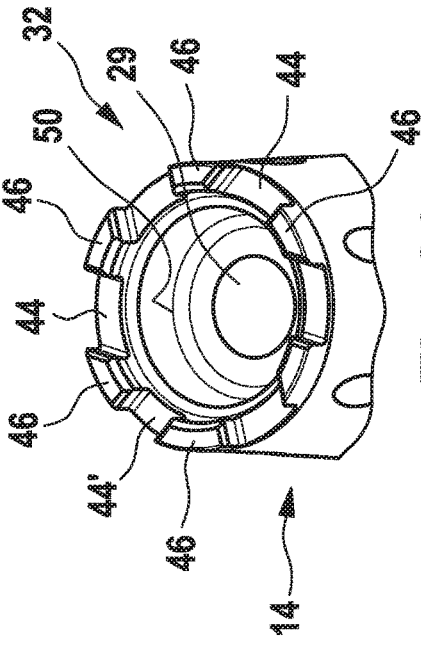
FIG. 21 shows a perspective view of the tool holder according to a fifth embodiment.

FIG. 19-22 show a fifth embodiment of the cutting insert 12 (FIGS. 19 and 20) and of the tool holder 14 (FIGS. 21 and 22). This fifth embodiment is very similar to the fourth embodiment, which is represented in FIG. 15-18. The difference between these two embodiments consists in the fact that the elevations arranged on the underside 38 of the cutting insert base body 20 are shaped somewhat differently. In the fourth embodiment shown in FIG. 15-18, the center axis of the elevations 40 runs respectively in the radial direction. This is not the case in the fifth embodiment shown in FIG. 19-22. Instead, the torque transfer surfaces 56 arranged on the elevations 40 run in the radial direction. The same applies to the torque transfer surfaces 58 provided on the holder 14. This ensures an improved force transmission between holder 14 and cutting insert 12. Moreover, the side faces 56', 58' opposite the torque transfer surfaces 56, 58 are thereby relieved of load.

Finally, it should be mentioned that the number of elevations 40 does not absolutely necessarily have to correspond to the number of cutting bodies 24. It is also possible for the number of elevations 40 to be greater or less than the number of cutting bodies 24.

What is claimed is:

1. A cutting insert for a tool for machining a workpiece, comprising:
   a base body, which defines a cutting insert longitudinal axis;
   at least one cutting body, which laterally projects from a periphery of the base body and comprises a cutting edge;
   a cutting insert bore, which is provided in the base body and extends along the cutting insert longitudinal axis, wherein on an underside, running transversely to the cutting insert longitudinal axis, of the base body are provided a plurality of elevations, which are arranged distributed in a peripheral direction and protrude from the underside of the base body, so that between respectively two adjacent elevations a relative depression is respectively obtained, wherein the peripheral direction is orthogonal to the cutting insert longitudinal axis;
   at least one radial contact surface, a plurality of axial contact surfaces and a plurality of torque transfer surfaces for a bearing contact of the cutting insert against a tool holder, wherein the at least one radial contact surface lies on a conical envelope symmetrical to the cutting insert longitudinal axis, wherein the axial contact surfaces are respectively arranged either on a top side, running transversely to the cutting insert longitudinal axis, of the elevations, or on a base surface, running transversely to the cutting insert longitudinal axis, of the depressions, and the torque transfer surfaces are arranged respectively on a lateral flank of the elevations, wherein the at least one radial contact surface, the axial contact surfaces and the torque transfer surfaces run transversely to one another, and wherein each of the plurality of torque transfer surfaces extends along a radial direction that is orthogonal to the cutting insert longitudinal axis and orthogonal to the peripheral direction; and
   a spigot, which protrudes further from the underside of the base body than the elevations and is symmetrical to the cutting insert longitudinal axis, and wherein the at least one radial contact surface is an uninterrupted, continuous conical surface which is arranged on an outer side, facing away from the cutting insert longitudinal axis, of the spigot.

2. The cutting insert as claimed in claim 1, wherein an inner side, facing toward the cutting insert longitudinal axis, of the elevations adjoins the cutting insert bore or is separated therefrom by a chamfer, a countersink or a recess.

3. The cutting insert as claimed in claim 1, wherein the elevations extend outward from a periphery of the spigot.

4. The cutting insert as claimed in claim 1, wherein the axial contact surfaces lie in a common plane which is arranged perpendicular to the cutting insert longitudinal axis.

5. The cutting insert as claimed in claim 1, wherein each of the torque transfer surfaces is arranged perpendicular to the axial contact surfaces and parallel to the cutting insert longitudinal axis.

6. The cutting insert as claimed in claim 1, wherein the torque transfer surfaces are sintered and unpolished surfaces, and the at least one radial contact surface and the axial contact surfaces are ground surfaces.

7. The cutting insert as claimed in claim 1, wherein the elevations comprise a first elevation and a second elevation, wherein the first elevation has a different shape and/or size than the second elevation.

8. The cutting insert as claimed in claim 1, wherein the elevations are separated from one another in the peripheral direction.

9. The cutting insert as claimed in claim 1, wherein the cutting insert comprises three, six or nine of said elevations.

10. A tool for machining a workpiece, comprising a cutting insert, a tool holder, and a fastening element which fastens the cutting insert to the tool holder, wherein the cutting insert comprises:
  a base body, which defines a cutting insert longitudinal axis;
  at least one cutting body, which laterally projects from a periphery of the base body and comprises a cutting edge;
  a cutting insert bore, which is provided in the base body and extends along the cutting insert longitudinal axis, wherein on an underside, running transversely to the cutting insert longitudinal axis, of the base body are provided a plurality of elevations, which are arranged distributed in a peripheral direction and protrude from the underside of the base body, so that between respectively two adjacent elevations a relative depression is respectively obtained, wherein the peripheral direction is orthogonal to the cutting insert longitudinal axis;
  at least one radial contact surface, a plurality of axial contact surfaces and a plurality of torque transfer surfaces for a bearing contact of the cutting insert against a tool holder, wherein the at least one radial contact surface lies on a conical envelope symmetrical to the cutting insert longitudinal axis, wherein the axial contact surfaces are respectively arranged either on a top side, running transversely to the cutting insert longitudinal axis, of the elevations, or on a base surface, running transversely to the cutting insert longitudinal axis, of the depressions, and the torque transfer surfaces are arranged respectively on a lateral flank of the elevations, wherein the at least one radial contact surface, the axial contact surfaces and the torque transfer surfaces run transversely to one another, and wherein each of the plurality of torque transfer surfaces extends along a radial direction that is orthogonal to the cutting insert longitudinal axis and orthogonal to the peripheral direction; and
  a spigot, which protrudes further from the underside of the base body than the elevations and is symmetrical to the cutting insert longitudinal axis, and wherein the at least one radial contact surface is an uninterrupted, continuous conical surface which is arranged on an outer side, facing away from the cutting insert longitudinal axis, of the spigot.

11. A tool holder for a tool for machining a workpiece, comprising:
  a shank, which extends substantially along a holder longitudinal axis and comprises at a front-face end an interface for connecting a cutting insert to the tool holder, wherein the interface comprises a plurality of depressions, which are arranged distributed in a peripheral direction and are separated from one another by relative elevations which are formed respectively between two adjacent depressions, wherein the peripheral direction is orthogonal to the holder longitudinal axis;
  a holder bore, which is provided in the shank and extends along the holder longitudinal axis,
  at least one radial contact surface, a plurality of axial contact surfaces and a plurality of torque transfer surfaces for a bearing contact of the cutting insert against the tool holder, wherein the at least one radial contact surface lies on a conical envelope which is symmetrical to the holder longitudinal axis, wherein the axial contact surfaces are arranged respectively either on a base surface, running transversely to the holder longitudinal axis, of the depressions, or on a top side, running transversely to the holder longitudinal axis, of the elevations, and the torque transfer surfaces are arranged respectively on a lateral flank of the depressions, and wherein the at least one radial contact surface, the axial contact surfaces and the torque transfer surfaces run transversely to one another, and wherein each of the plurality of torque transfer surfaces extends along a radial direction that is orthogonal to the holder longitudinal axis and orthogonal to the peripheral direction, and
  a spigot, which protrudes further from the front-face end of the tool holder than the elevations and is symmetrical to the holder longitudinal axis, wherein the at least one radial contact surface is a continuous conical surface which is arranged on an outer side, facing away from the holder longitudinal axis, of the spigot.

12. The tool holder as claimed in claim 11, wherein the elevations extend outward from a periphery of the spigot.

13. The tool holder as claimed in claim 11, wherein the axial contact surfaces lie in a common plane which is arranged perpendicular to the holder longitudinal axis.

14. The tool holder as claimed in claim 11, wherein each of the torque transfer surfaces is arranged perpendicular to the axial contact surfaces and parallel to the holder longitudinal axis.

15. The tool holder as claimed in claim 11, wherein the torque transfer surfaces are sintered and unpolished surfaces, and the at least one radial contact surface and the axial contact surfaces are ground surfaces.

16. The tool holder as claimed in claim 11, wherein the elevations comprise a first elevation and a second elevation, wherein the first elevation has a different shape and/or size than the second elevation.

17. The tool holder as claimed in claim 11, wherein the elevations are separated from one another in the peripheral direction.

18. The tool holder as claimed in claim 11, wherein the tool holder comprises three, six or nine of said elevations.

19. A tool for machining a workpiece, comprising a cutting insert, a tool holder, and a fastening element which fastens the cutting insert to the tool holder, wherein the tool holder comprises:
- a shank, which extends substantially along a holder longitudinal axis and comprises at a front-face end an interface for connecting a cutting insert to the tool holder, wherein the interface comprises a plurality of depressions, which are arranged distributed in a peripheral direction and are separated from one another by relative elevations which are formed respectively between two adjacent depressions, wherein the peripheral direction is orthogonal to the holder longitudinal axis;
- a holder bore, which is provided in the shank and extends along the holder longitudinal axis,
- at least one radial contact surface, a plurality of axial contact surfaces and a plurality of torque transfer surfaces for a bearing contact of the cutting insert against the tool holder, wherein the at least one radial contact surface lies on a conical envelope which is symmetrical to the holder longitudinal axis, wherein the axial contact surfaces are arranged respectively either on a base surface, running transversely to the holder longitudinal axis, of the depressions, or on a top side, running transversely to the holder longitudinal axis, of the elevations, and the torque transfer surfaces are arranged respectively on a lateral flank of the depressions, and wherein the at least one radial contact surface, the axial contact surfaces and the torque transfer surfaces run transversely to one another, and wherein each of the plurality of torque transfer surfaces extends along a radial direction that is orthogonal to the holder longitudinal axis and orthogonal to the peripheral direction; and
- a spigot, which protrudes further from the front-face end of the tool holder than the elevations and is symmetrical to the holder longitudinal axis, wherein the at least one radial contact surface is a continuous conical surface which is arranged on an outer side, facing away from the holder longitudinal axis, of the spigot.

* * * * *